Patented May 22, 1928.

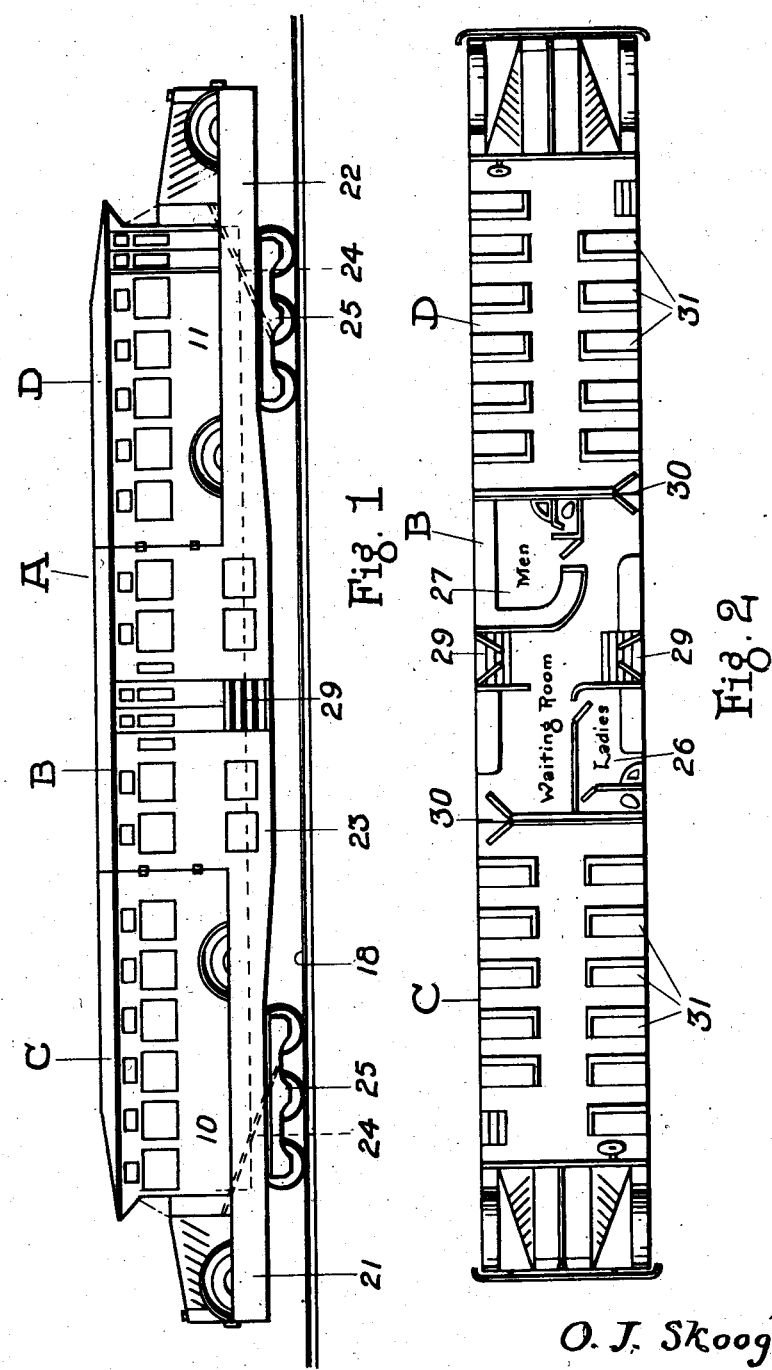

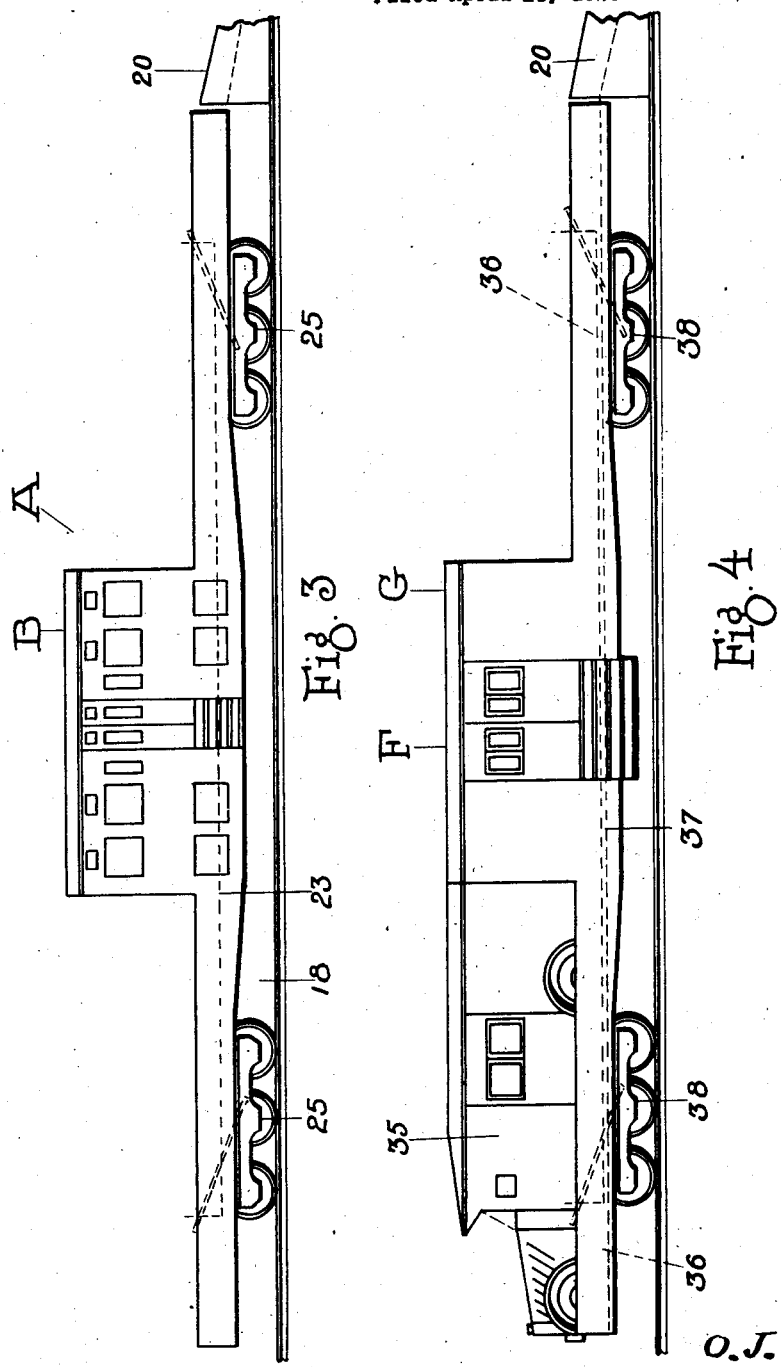

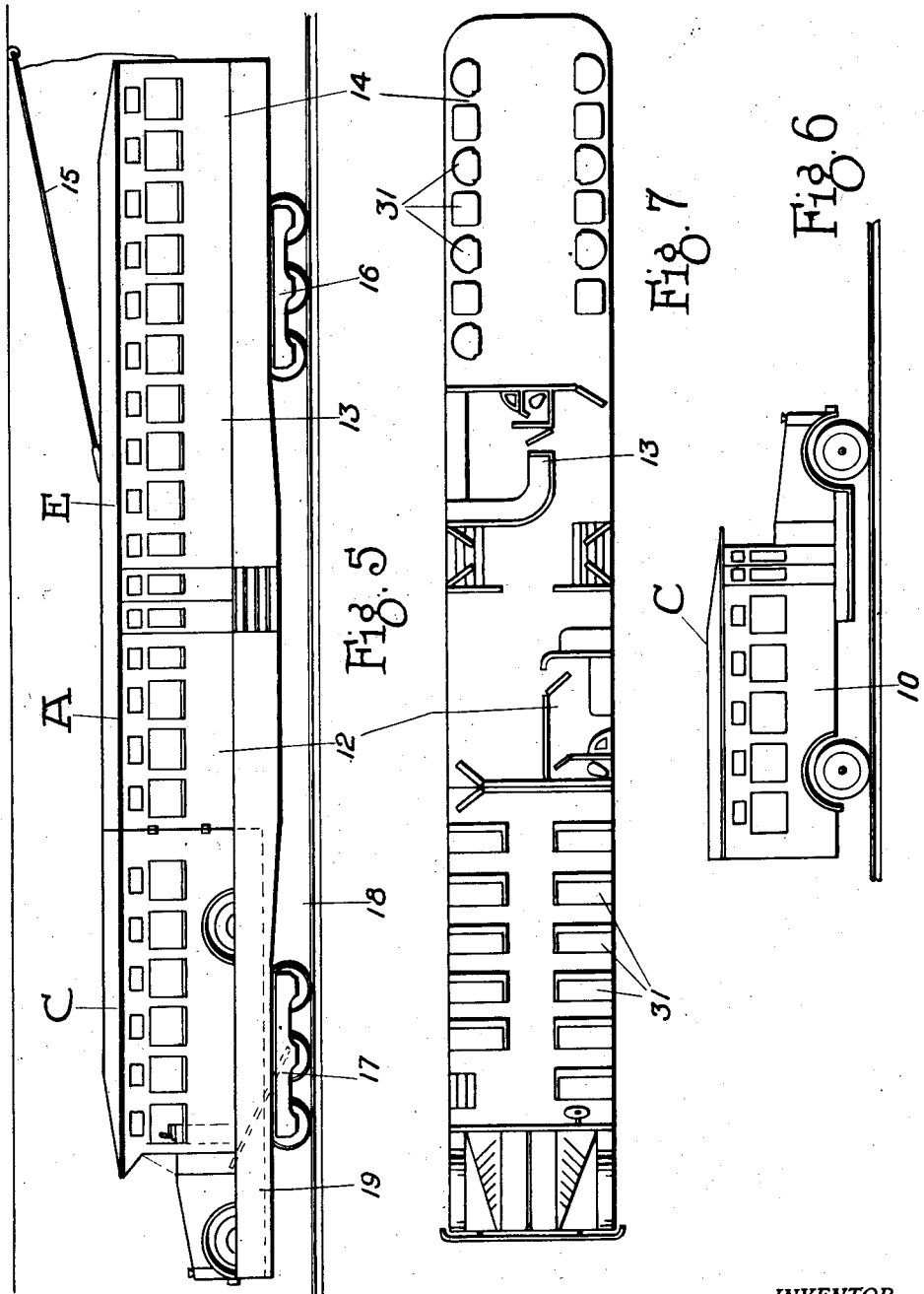

1,670,907

UNITED STATES PATENT OFFICE.

OSCAR J. SKOOGLUN, OF ST. PAUL, MINNESOTA.

RAILWAY MOTOR BUS.

Application filed April 16, 1925. Serial No. 23,537.

My invention relates to railway motor bus coaches for passenger and freight or express service and is particularly adapted to a peculiar construction wherein the railway motor bus is made up of a car having one or more road busses secured thereto. The motor bus is detachable from the railway car in any suitable manner, so that the bus can be driven on the road just the same as any ordinary automobile bus and, in fact, the bus has every appearance of the ordinary automobile bus, which is now used on the highways.

A feature of the invention resides in a railway car designed with bus receiving platforms so that the automobile bus can be driven onto the car platform and secured to the car so as to become a part of the same, thus providing a detachable automobile bus in conjunction with the trucks and framework of the railway car, so that my railway motor bus can be run on regular railway tracks from station to station and as far as may be described.

The invention includes means for providing my railway motor bus with a cab or body portion which is adapted to provide the accommodations as are ordinarily provided on any railway sleeping car, or chair car where it is desirable to have rest and wash rooms for men and ladies, so that in the course of travel the conveniences can be arranged. This construction provides means in connection with my road automobile busses so that when these busses are attached to the car frame, after being driven upon the receiving platform and firmly attached to make up a part of the coach, my railway motor bus is complete to give to the passengers every convenience possible. Sleeping compartments of the same nature as used on sleeping cars and of an ordinary construction, not shown in the drawings, may be provided, thus permitting my railway motor bus coach to be operated over a considerable distance on railway tracks by the power of the automobile busses, to afford the passengers traveling in these busses sleeping accommodations the same as on a train and such as has not been possible heretofore to accommodate passengers with in the ordinary automobile road busses.

The invention includes the combination of desirable features in making up a railway motor bus coach, a portion of which is left upon the railway track at a suitable waiting platform until the automobile busses which are designed to complete my railway motor bus coach arrive with the passengers, express or freight and as soon as these busses are securely attached to the end platforms of the coach and the necessary connections are made my railway motor bus coach is ready to travel in a very practical manner on the ordinary railway tracks, thus providing a very economical and desirable means of transporting either passengers, express or freight at a small cost and giving the convenience to the passengers of being taken directly to the railway coach without having to transfer either themselves or their baggage before starting on a longer trip in my railway motor bus coach.

My invention also includes automobile bus means which is adapted to travel over the ordinary roads and which is adapted to be associated with an electrical coach where a trolley is employed or a plow for a third rail system, so that when the auto bus is attached to the coach the electric propelling means can be used to carry my coach over the railway tracks in a very practical manner. It is quite important to consider at this time that my railway coach is very desirable to provide means for transportation in a practical manner and at a small cost. The features will be very apparent owing to the present day development of good roads and the extensive use of automobile busses.

Other features and advantages, together with the peculiar arrangement and construction of parts, will be more clearly set forth in the specification and claims.

In the drawings forming part of the specification,

Figure 1 is a side view of my railway motor bus coach.

Figure 2 is a diagrammatic plan view of the same.

Figure 3 is a side view of the coach when the motor busses are removed therefrom.

Figure 4 is a side view of a form of my railway motor bus coach, showing only one motor bus attached to the car frame.

Figure 5 illustrates my motor bus coach as used with a trolley car where it is propelled by electric current.

Figure 6 is a side view of one of the motor busses used in carrying out my invention.

Figure 7 is a plan view of the coach illustrated in Figure 5, diagrammatically illustrating the same.

In the drawings my railway coach A is provided with a central coach portion B and the end coach portions C and D. The portions C and D of the coach A can be made up of the coach or body portion of automobile busses 10 and 11 respectively. In some forms of my coach A only one bus, such as C, is used, or similar to the automobile bus 10, which is illustrated in Figure 6. In this construction the other portion of the coach A, such as E, is of any suitable coach construction inside, to provide a ladies' compartment 12, a gentlemen's compartment 13 and an observation compartment 14. In the construction of my coach illustrated in Figure 5 the same is propelled by means of a trolley 15 and is provided with any suitable form of propelling motors which are attached to the trucks and which are not illustrated in the drawings. It is also obvious that the construction of the electric motors and attachment to the same of the trucks 16 and 17 in this electrically propelled coach A are all of ordinary, well known construction and it is obviously not essential that they be illustrated in detail in the drawings.

In this construction where the coach A is electrically propelled on the railway tracks 18 the bus C is secured in any suitable manner, not illustrated in the drawings, to the coach body E and the bus is supported on the platform 19 so that the automobile bus 10 or C is ready at all times to be disengaged from the coach E and driven off of the platform 19 by its own power onto the roadway. Obviously the bus C is not driven off of the platform 19 until the coach A has been stopped at a suitable unloading platform, such as 20, illustrated in Figure 3 of the drawings. The platform 20 is only illustrated in part in Figure 3 and this platform can be of any suitable construction to merely provide a track or platform means so that the busses can be driven onto or off of the platforms of the coach A.

In the drawings in Figure 1 I have illustrated the coach A with two bus receiving platforms 21 and 22 on either end of the car A, while the central portion B of the coach A is formed integral with the frame 23 and so as to form a permanent part therewith. The busses 10 and 11 which form the portions C and D of the coach A are secured to the permanent portion B when the coach is made up ready to travel on the tracks 18, so that the side appearance of the coach is as illustrated in Figure 1.

By means of suitable connecting shafts 24 the motors of the busses 10 and 11 can be connected to the trucks 25 of the car A, in Figure 1, and thus the coach A can be driven on the railway track by its own power. This means of connection is only illustrated diagrammatically as it is evident that any suitable connecting means can be provided to drive the trucks 25. I desire to have it understood that the coach A is self-propelled to provide an economical means of driving the same and when the automobile busses 10 and 11 are removed the coach A would appear as illustrated in Figure 3, with only the central portion of the coach such as B supported by the frame 23.

The drive shaft of the motor truck can be disconnected and the universal joint at the transmission of the truck is connected with the shaft having another universal joint which connects with the truck to drive the truck. It is also apparent that each of the trucks may carry an electric motor and that the gas engine of the busses can operate a generator which feeds current through a controller to the respective motors on the respective truck.

The central portion B of the coach A in this construction is divided off into compartments 26 and 27 which provide ladies' and men's wash rooms very similar in construction as are used on sleeping cars of railway trains. The compartment B also is formed with suitable waiting room in the body of the same between the compartments 26 and 27, so that passengers can come into the waiting room 28 and remain until the busses 10 and 11 are in place, ready to operate the coach A. Entries 29 are provided on either side of the coach portion B, so that the waiting room 28 can be entered from either side of the same.

This means of construction provides a portable waiting station which can be parked on a side track or in any suitable place on the railway track 18 to await the arrival of the busses 10 and 11, and when the car A is made up completely by the coach portions B, C and D the same is ready to travel as any other railway coach, excepting being propelled by its own power on the railway tracks. This provides a very desirable means of transportation as it is economical to operate.

Suitable entries are provided in the coach portions C and D such as 30, which communicate with corresponding openings in the ends of the compartment B of the coach A, so that passengers from the coaches C and D can enter the compartment B at any time.

Obviously the automobile 31 can be so constructed as to provide sleeping berths at night and thus the coach can travel day or night, either long or short distances over the railway tracks. The railway companies fully appreciate my railway motor bus coach as a feasible means of competing with ordinary automobile busses which now travel only over the roads and highways. The advantage of my invention is that I provide a railway coach having every convenience of the modern means of transportation for passengers, in railway coaches, and yet I include the automobile busses which are readily detachable so that they can travel freely over the highways or roads and pick up passengers, bringing them from the hotel direct to the coach without transferring either their baggage or themselves, so that when the parts of my coach are connected together the passengers can leave their home, be picked up on the road at any point over which my busses are adapted to travel, be carried from their hotel or in fact from any place that may be desired, and as soon as they step into the busses 10 or 11 they are practically boarding the coach A as it is not necessary for them to again transfer until they reach their destination. When the coach A reaches its destination of travel over the tracks 18 it is stopped and by means of the unloading platform 20 the auto busses 10 and 11 drive off of the platforms 21 and 22 and take the passengers direct to their homes or hotels. In this manner I not only provide a most desirable means of transportation but I accomplish a feature which has not been done heretofore in so far as I know.

In carrying out my invention I provide a form of freight or express car which can be used independently of the passenger cars, or in combination with the same. In Figure 4 I illustrate a motor bus 35 which is of ordinary, well known construction and similar to the auto busses 10 and 11 which is supported by the platform 36 of the car F. The car F is similar to the car A, excepting that it may be used for passengers and freight or express or for freight and express alone, without using the passenger busses in connection with the same.

The car F is provided with a central cab portion G provided with similar accommodations as the compartment B and of a similar nature, excepting where freight is used in the busses 35 the compartment G is of less expensive construction. The compartment G is mounted upon a frame 37 which carries the platforms 36 on its ends. The car F is supported by suitable trucks 38. One of the platforms on the car F is empty as illustrated in Figure 4, while the loading platform 20 is in place ready to receive either a similar bus 35 or a bus similar to 10 or 11. In this manner I have clearly illustrated my invention to point out fully the novel means of transportation either of passengers or express and freight by means of separable and independently operable automobile busses, which can be connected together in an easy and practical manner, so as to make up my railway motor bus coach. This provides means of transportation which combines the railway car and tracks with the automobile bus means, so as to meet the popular demand for transportation by automobile motor bus and by which the passengers with the convenience of the railway travel on long trips. It is apparent that the automobile bus has established itself as a very necessary means of transportation and while it meets with certain inconveniences through bad weather, such as snow and other conditions, it is evident that the railway tracks provide means of transportation under certain conditions and over night where the passengers desire to rest while traveling which cannot be substituted by ordinary highway and automobile bus travel, thus every known convenience can be provided in my motor bus coach or car, even giving the observation car features as are illustrated in Figures 5 and 7 of the drawings, and giving the necessary heat, light and other conveniences to the passengers, all of which are of ordinary well known construction and are not illustrated in detail in the drawings, but which provide essential features in carrying out my invention, to make the most essential part thereof, which includes the separation of the automobile busses from the car frame practically to provide every convenience for transportation.

In accordance with the patent statutes I have described the principles of operation of my invention and I desire to have it understood that the separation of the coach in sections, some of the sections being self-propelled and forming highway busses, while the others remain as a part of the frame and car supported by railway trucks of ordinary construction, and while I have illustrated a particular formation of these parts, is only illustrative and diagrammatic and that the invention can be carried out by other means and applied to uses other than those above set forth within the scope of the following claims.

I claim:

1. A railway motor bus coach including a car frame, trucks for supporting said frame, an automobile bus and means for securing said bus to said frame in a manner to form a part of said railway coach, said coach being propelled by said automobile bus.

2. A means of transportation including a railway car made up of compartments, one of said compartments forming a permanent connection with a pair of platforms extending from either end thereof and the other of said compartments being made up of the body portion of automobile bus cars, said automobile bus cars being self-propelled, means for attaching said busses to the ends of said permanently fixed compartment, so that the bodies of said automobile busses form an extension of the central compartment and means connected with said automobile busses whereby the motors of said busses will drive said railway car.

3. A railway motor bus coach including a central compartment, a frame adapted to support said compartment, railway trucks adapted to support said frame, automobile bus receiving platforms formed on said frame on either end of said central compartment, means for securing said automobile busses to said central compartment in a manner so that the same can be readily detached from said supporting platforms and means for driving the trucks of said coach by the motors of said automobile busses.

4. A railway car for transportation including supporting trucks, a waiting compartment cab formed on said car and means on said car for receiving an automobile bus to support the same in a manner so that the car can be driven by said automobile bus and so that said automobile bus can be disengaged from said car and run independently upon the highway.

5. An automobile railway car including a compartment supported on railway trucks, and an automobile bus detachably secured to said compartment in a manner to be driven independently over a highway or supported by and forming a part of said railway car to provide means of transportation over railway tracks or on a highway and a portion of said car forming a portable waiting station when the automobile is detached therefrom.

OSCAR J. SKOOGLUN.